(12) United States Patent
Smith et al.

(10) Patent No.: US 12,431,945 B2
(45) Date of Patent: Sep. 30, 2025

(54) RECONFIGURABLE BEAMFORMER, PARTICULARLY FOR 5G NR

(71) Applicant: TEKO TELECOM S.r.l., Castel San Pietro Terme (IT)

(72) Inventors: David Smith, Castel San Pietro Terme (IT); Andrea Minieri, Castel San Pietro Terme (IT); Massimo Notargiacomo, Castel San Pietro Terme (IT); Davide Durante, Castel San Pietro Terme (IT)

(73) Assignee: TEKO TELEKOM S.R.L., Castel San Pietro Terme (IT)

( * ) Notice: Subject to any disclaimer, the term of this patent is extended or adjusted under 35 U.S.C. 154(b) by 255 days.

(21) Appl. No.: 18/247,514

(22) PCT Filed: Sep. 29, 2021

(86) PCT No.: PCT/IB2021/058897
§ 371 (c)(1),
(2) Date: Mar. 31, 2023

(87) PCT Pub. No.: WO2022/070063
PCT Pub. Date: Apr. 7, 2022

(65) Prior Publication Data
US 2023/0379011 A1    Nov. 23, 2023

(30) Foreign Application Priority Data

Oct. 1, 2020   (IT) .................. 102020000023230

(51) Int. Cl.
*H04B 7/0413* (2017.01)
*H04B 1/40* (2015.01)

(52) U.S. Cl.
CPC ............. *H04B 7/0413* (2013.01); *H04B 1/40* (2013.01)

(58) Field of Classification Search
CPC ................................ H04B 7/0413; H04B 1/40
See application file for complete search history.

(56) References Cited

U.S. PATENT DOCUMENTS

| | | | |
|---|---|---|---|
| 6,016,124 A * | 1/2000 | Lo ...................... | H04B 7/18515 |
| | | | 342/373 |
| 9,853,702 B1 | 12/2017 | Liang et al. | |
| 2019/0089434 A1 * | 3/2019 | Rainish ................. | H04B 7/086 |

FOREIGN PATENT DOCUMENTS

| | | |
|---|---|---|
| EP | 2 725 657 A1 | 4/2014 |
| EP | 2 882 110 A1 | 6/2015 |
| EP | 3 479 490 A1 | 5/2019 |

* cited by examiner

*Primary Examiner* — Rahel Guarino
(74) *Attorney, Agent, or Firm* — BRYAN CAVE LEIGHTON PAISNER LLP

(57) ABSTRACT

A reconfigurable beamformer comprising a digital signal processor; an ADC/DAC operatively connected to the digital signal processor; an analogue signal processor operatively connected to the ADC/DAC; an antenna array operatively connected to said analogue signal processor.

18 Claims, 5 Drawing Sheets

Fig.7
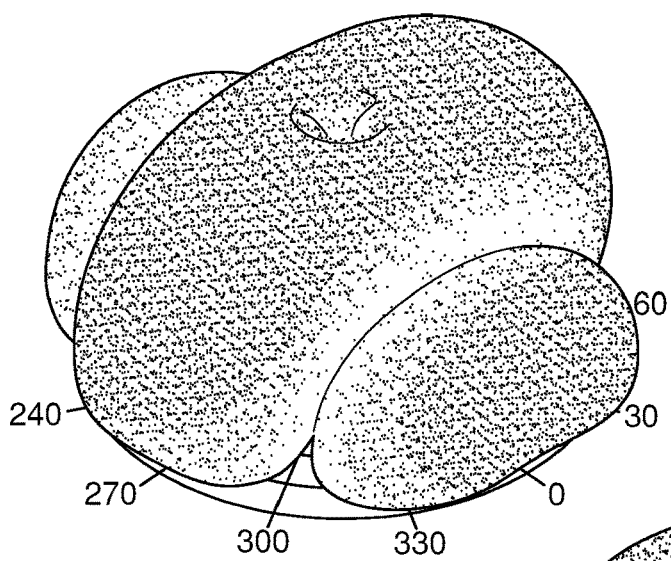
Fig.8
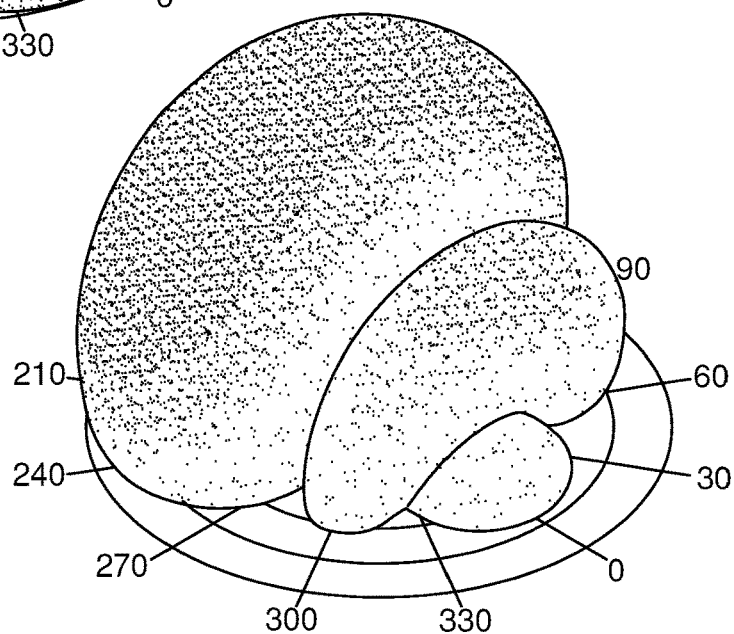
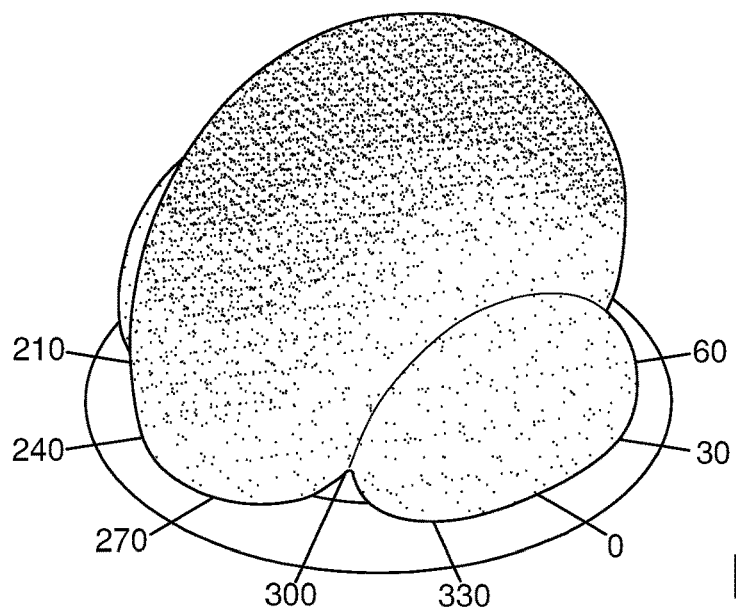
Fig.9

RECONFIGURABLE BEAMFORMER, PARTICULARLY FOR 5G NR

CROSS-REFERENCE TO RELATED APPLICATIONS

This application claims priority to IT patent application Ser. No. 10/202,0000023230 filed on Oct. 1, 2020, and this application claims priority to and is a 371 of international PCT Application No. PCT/IB2021/058897 filed on Sep. 29, 2021, the entire contents of which are hereby incorporated by reference.

TECHNICAL FIELD

The present invention relates to a reconfigurable beamformer, usable particularly for 5G NR.

BACKGROUND ART

In the field of telecommunications, it is known that there is the need to design transceivers for indoor use in the three designated bands (n258, n257 and n260) of 5G NR.

The same need would arise if further bands are designated for 5G NR.

Furthermore, the same need exists for outdoor use.

Particularly, as regards to the frequency, it is assumed that each of the three 5G NR bands would be covered by different hardware. However, the three 5G NR bands are much wider (3 GHz) than what an individual mobile supplier would provide in a specific country (50 MHz to 400 MHz).

A traditional way to solve this problem is to design different hardware for each supplier, resulting in multiple different part numbers.

Furthermore, as regards to the antenna pattern, given the specific layout of the building, the transceivers of the known type would need to be placed along walls, in corners or on the ceiling. For each of these locations, a different antenna pattern is more appropriate (Omni-Directional versus Directional).

While mechanical brackets could be used to tilt the transceivers, the inherent antenna pattern would remain the same.

A traditional way to solve this problem is to design different hardware for each location, resulting in multiple different part numbers.

Finally, as regards to the antenna polarization, under certain conditions (coverage being an example), the optimal solution would be either linear polarized antennas or circular polarized antennas. For the case of MIMO 2×2, it is common to use cross polarized antennas.

A traditional way to solve this problem is to design different hardware for each polarization, resulting in two different part numbers.

DESCRIPTION OF THE INVENTION

An objective of the present invention is to provide a reconfigurable beamformer that can be software configured on site by the installer, choosing from precalibrated sub-bands.

Another objective of the present invention is to provide a reconfigurable beamformer that can be software configured on site by the installer, choosing from precalibrated patterns.

Another objective of the present invention is to provide a reconfigurable beamformer that can be software configured to be linear polarized or circular polarized, wherein the switch is programmable on the fly.

The above-mentioned objectives are achieved by the present reconfigurable beamformer according to the features of claim 1.

BRIEF DESCRIPTION OF THE DRAWINGS

Other characteristics and advantages of the present invention will become better evident from the description of a preferred, but not exclusive embodiments of a reconfigurable beamformer, usable particularly for 5G NR, illustrated by way of an indicative but non-limitating example in the accompanying Figures, in which:

FIGS. 7, 8 and 9 shows examples of possible different shapes of the antenna pattern obtainable by means of the beamformer according to the invention.

EMBODIMENTS THE INVENTION

Figure 1:
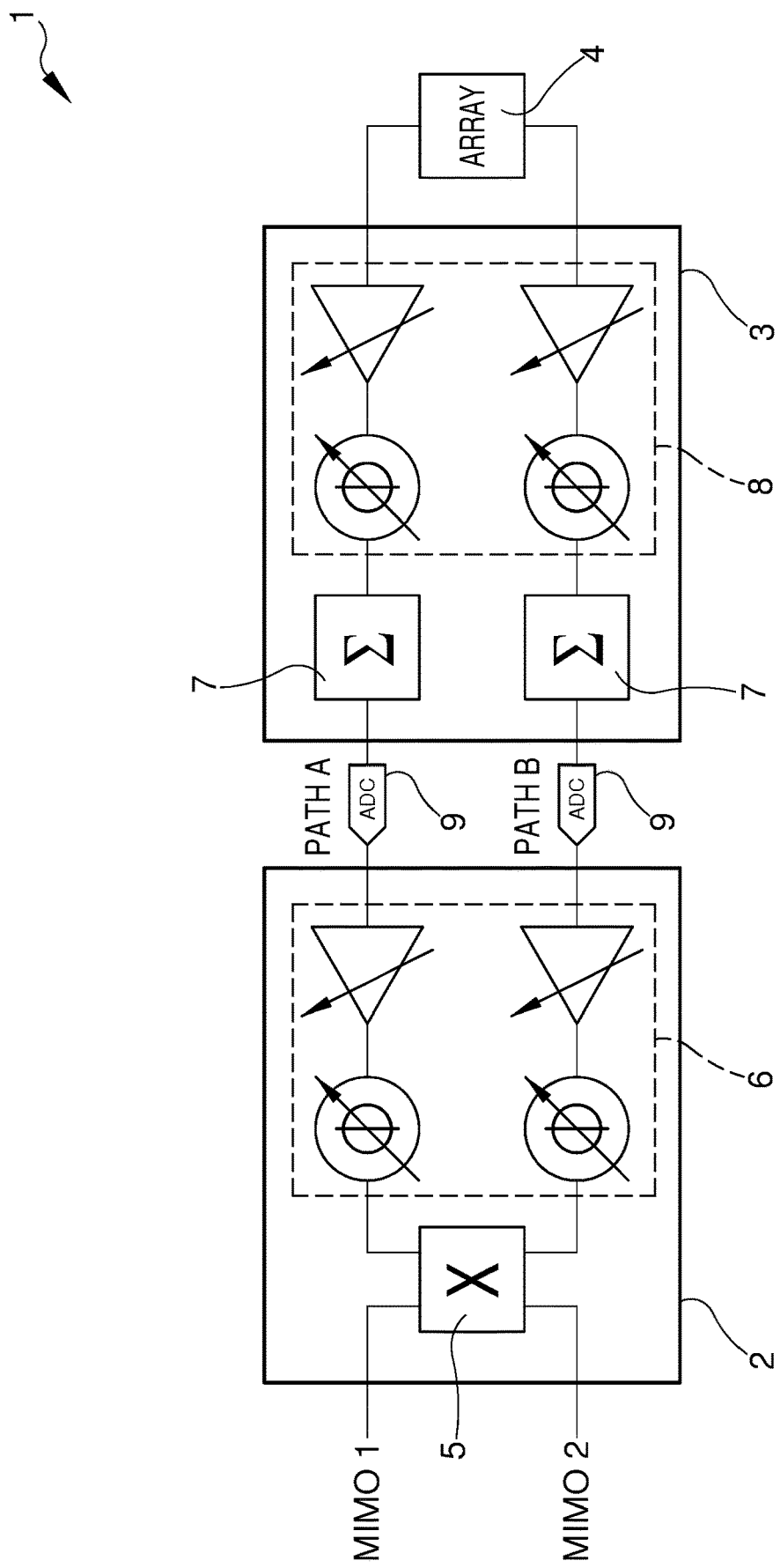
FIG. 1 shows a basic diagram of the reconfigurable beamformer according to the invention in a transmitter mode.

With particular reference to such illustrations, globally indicated with reference 1 is a reconfigurable beamformer, usable particularly for 5G NR.

It is pointed out that the current invention can be effectively used to reach the need to design transceivers for indoor use in the three designated bands (n258, n257 and n260) of 5G NR, but it is not limited to "indoor" usage and "n258, n257, n260" frequencies.

Particularly, the proposed technique may apply also on other RF coverage where flexibility in shaping the antenna pattern is needed, so it is not limited to 5G NR/mmWave.

The reconfigurable beamformer 1 according to the invention comprises:

At least a digital signal processor 2;
At least an ADC/DAC 9 (analog to digital converter and digital to analog converter) operatively connected to the digital signal processor 2;
At least an analogue signal processor 3 operatively connected to the ADC/DAC 9;
At least an antenna array 4 operatively connected to the analogue signal processor 3.

The digital signal processor 2 comprises:
At least a digital matrix 5;
At least a digital beamformer 6 connected to the digital matrix 5.

The ADC/DAC 9 comprises:
At least an analog to digital converter (ADC) configured to operate during a receiver mode of the beamformer 1, as showed in FIG. 1;
At least a digital to analog converter (DAC) configured to operate during a transmitter mode of the beamformer 1, as showed in FIG. 2.

During receiver mode, the ADC/DAC 9 is configured to convert the analog output of the analog signal processor 3 into a digital signal for input to the digital signal processor 2.

Similarly, during transmitter mode, the ADC/DAC 9 is configured to convert the digital output of the digital signal processor 2 into an analog signal for input to the analog signal processor 3.

The analogue signal processor 3 comprises:
At least an electronic combiner 7;
At least an analogue beamformer 8 connected to the electronic combiner 7.

The antenna array 4 comprises a plurality of antenna array elements 4'.

The digital matrix 5 is configured for selecting between different signal content based on the selected antenna polarization.

Particularly, as showed in the receiver mode example of FIG. 1, the digital signal processor 2 has path A and path B signal inputs and MIMO 1 and MIMO 2 signal outputs.

Figure 2:
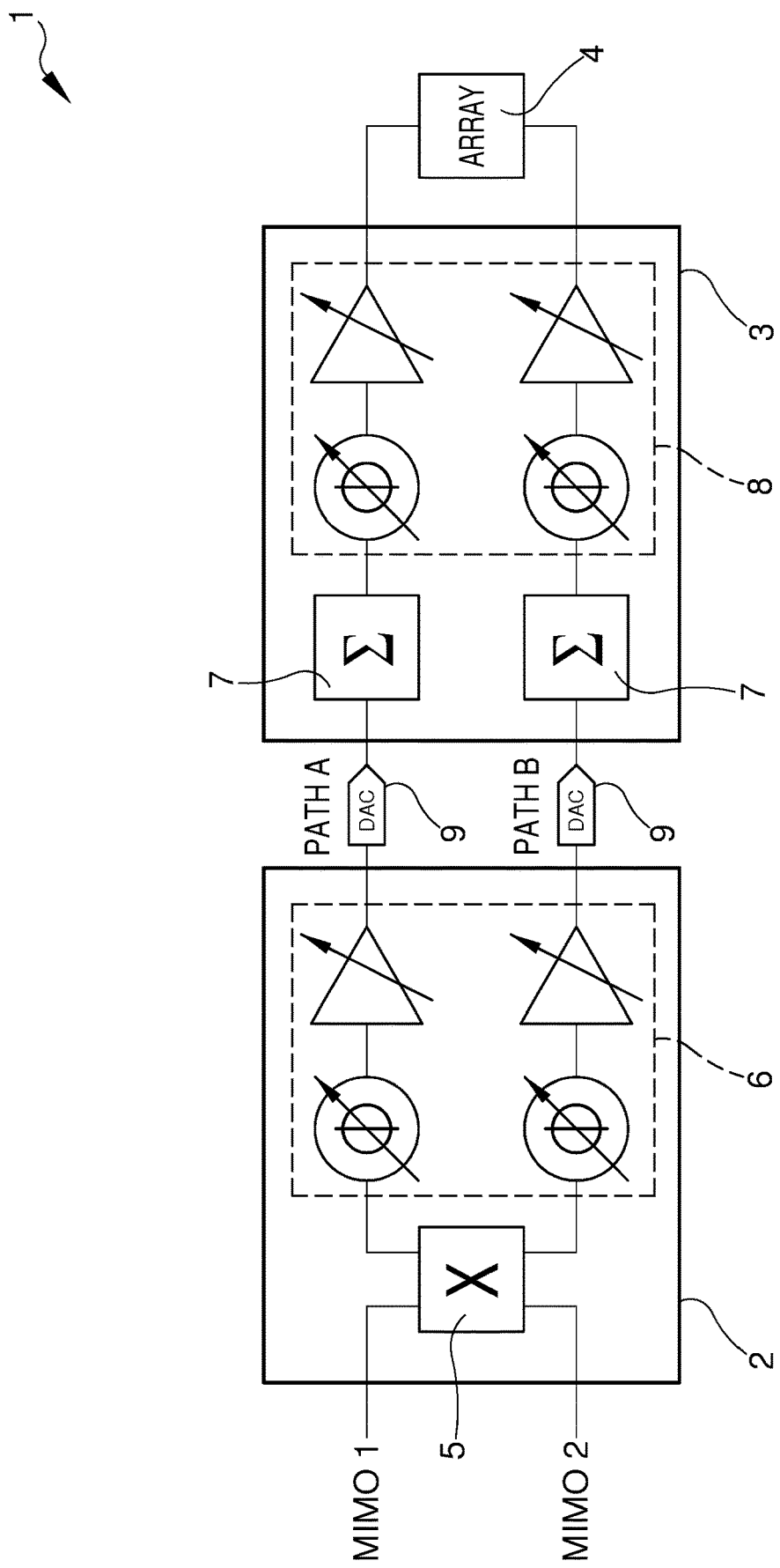
FIG. 2 shows a basic diagram of the reconfigurable beamformer according to the invention in a receiver mode.

Similarly, as showed in the transmitter mode example of FIG. 2, the digital signal processor 2 has MIMO 1 and MIMO 2 signal inputs and path A and path B signal outputs.

Therefore, the digital matrix 5 is configured for selecting between different signal content based on the selected antenna polarization according to the following configurations:
path A contains either:
  only MIMO 1 for linear polarization;
  both MIMO 1 and MIMO 2 for circular polarization, where MIMO 2 is shifted by P degrees;
path B contains either:
  only MIMO 2 for linear polarization;
  both MIMO 1 and MIMO 2 for circular polarization, where MIMO 1 is shifted by +90 degrees and MIMO 2 is shifted by P-90 degrees.
P degrees shifting is chosen in order to minimize peak power.

The digital beamformer 6 is configured to modify the relative phase/amplitude of each path (path A or path B) independently.

The electronic combiner 7 is configured to combine the antenna array elements 4' of the antenna array 4 connected to the analogue signal processor 7.

Furthermore, the analogue beamformer 8 is configured to modify the relative phase/amplitude of each of the antenna array elements 4' independently.

Figure 3:
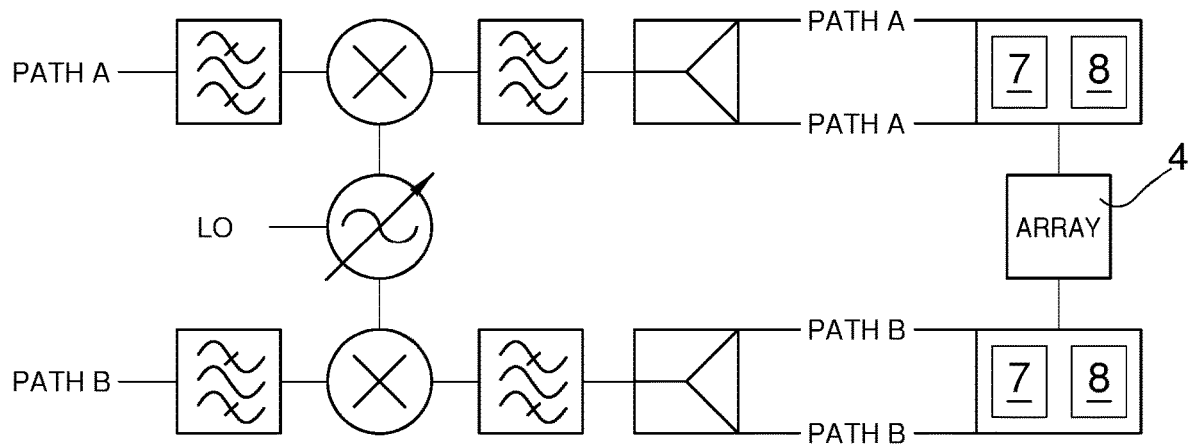
FIG. 3 is a basic block diagram of key components of the reconfigurable beamformer according to a first possible design.
Figure 4:
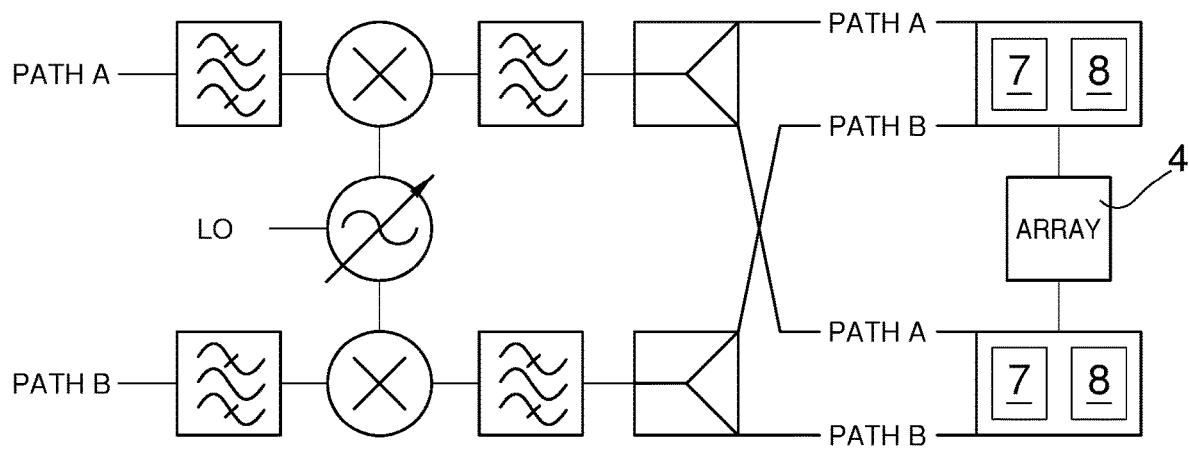
FIG. 4 is a basic block diagram of key components of the reconfigurable beamformer according to a second possible design.

The exact layout of the analogue signal processor 3 as well as the interconnections between the analogue signal processor 3 and the digital signal processor 2 result in two possible configurations, shown in FIG. 3 and FIG. 4.

Figure 5:
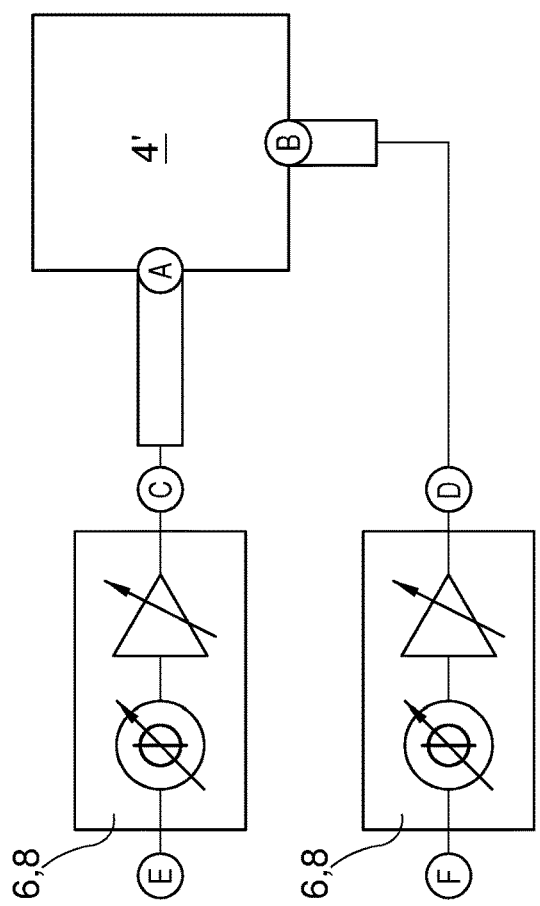
FIG. 5 shows details of the excitation of a single antenna array element of the antenna array.

According to the first configuration, showed in FIG. 3, there are two antenna arrays 4. Path A is connected to only one of the antenna arrays 4, while path B is connected to the other antenna array 4. For this configuration, only circular polarization is applicable. As shown in FIG. 5, related to a transmitter mode, an antenna array element 4' of the first antenna array 4 has path A connected to both antenna feeds. Similarly, an antenna array element 4' of the second antenna array 4 has path B connected to both antenna feeds.

According to a second configuration, showed in FIG. 4, there is only a single antenna array 4. Path A is connected to only one half of the antenna array 4, while path B is connected to the other half of the antenna array 4. For this configuration, both linear polarization and circular polarization are applicable. As showed in in FIG. 5, each antenna array element 4' of the antenna array 4 has path A connected to one antenna feed, while the other antenna feed would be connected to path B.

While both designs can tune the frequency, antenna pattern and antenna polarization, only the second configuration has the appropriate interconnections to utilize the different antenna polarizations.

As regards to the frequency/polarization, FIG. 5 shows an example of the excitation of a single antenna array element 4' in isolation, which is applicable to each antenna array element 4' separately.

Particularly, to generate the desired polarization (linear polarization or circular polarization) at the desired frequency, the phase offset between points A and B needs to be set. The effect of the feeds on the relative phase is frequency dependent, resulting in a different phase offset between points C and D in each subband.

The digital beamformer 6 and/or the analogue beamformer 8 are configured for controlling the relative phase between the two feeds of each antenna array element 4' to provide the desired phase offset, as well as compensating for the feeds.

To utilize the different antenna polarizations, the signals at points E and F need to be connected to different paths (Paths A and B), which is only achieved in the FIG. 4 configuration.

Figure 6:
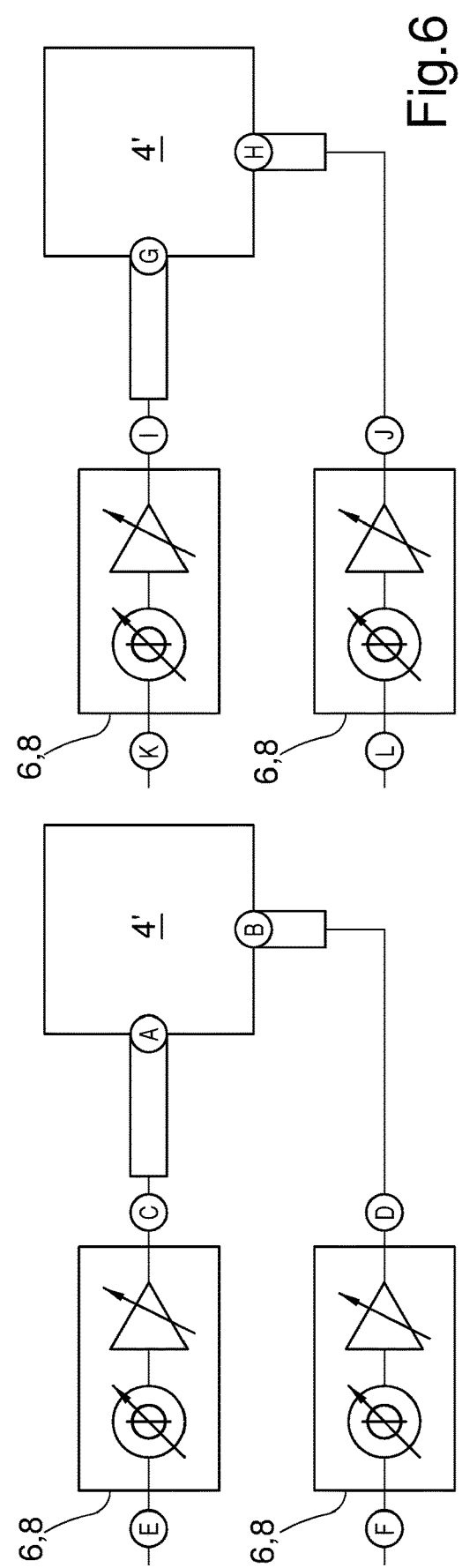
FIG. 6 shows details of the excitation of two antenna array elements of the antenna array.

As regards to the frequency/pattern, FIG. 6 shows an example of the excitation of two antenna array elements 4', which is applicable to the antenna array 4 as a whole.

Particularly, to generate the desired pattern (omni directional pattern or directional pattern) at the desired frequency, the phase offset between points A/B and G/H needs to be set. Only the analogue beamformer 8 is configured for controlling the relative phase between the two antenna array elements 4' to provide the desired phase offset.

Also, the digital beamformer 6 and/or the analogue beamformer 8 are/is configured for tuning the relative phase to add a tilt to the antenna pattern (similar action as a mechanical bracket).

Therefore, the gain/phase control can be used to alter the relative gain/phase of the signal paths to change the shape of the antenna pattern and/or tilt the antenna pattern.

FIGS. 7, 8 and 9 show examples of different shapes of the antenna pattern using the same reconfigurable beamformer 1 (same hardware), but just using the gain/phase control of the digital beamformer 6 and of the analogue beamformer 8.

In practice it has been found that the described invention achieves the intended aim and objects.

The invention claimed is:

1. A reconfigurable beamformer comprising:
   a digital signal processor;
   an analog to digital converter/digital to analog converter (ADC/DAC) operatively connected to the digital signal processor;
   an analog signal processor operatively connected to the ADC/DAC; and
   an antenna array operatively connected to said analog signal processor,
   wherein said digital signal processor is configured for selecting between different signal content based on a selected antenna polarization.

2. The reconfigurable beamformer according to claim 1, wherein said digital signal processor comprises a digital matrix.

3. The reconfigurable beamformer according to claim 2, wherein said digital signal processor comprises at least a digital beamformer connected to said digital matrix, and wherein said digital matrix is configured for selecting between the different signal content based on the selected antenna polarization.

4. The reconfigurable beamformer according to claim 1, wherein said ADC/DAC comprises:
   an ADC configured to operate during a receiver mode of a beamformer;
   a DAC configured to operate during a transmitter mode of a beamformer.

5. The reconfigurable beamformer according to claim 3, wherein said analog signal processor comprises an electronic combiner.

6. The reconfigurable beamformer according to claim 5, wherein said analog signal processor comprises an analog beamformer connected to said electronic combiner and to said antenna array.

7. The reconfigurable beamformer according to claim 1, wherein said antenna array comprises a plurality of antenna array elements.

8. The reconfigurable beamformer according to claim 1, wherein said digital signal processor has multiple-input multiple-output (MIMO) 1 and MIMO 2 signal inputs/outputs and path A and path B outputs/inputs.

9. The reconfigurable beamformer according to claim 8, wherein a digital matrix is configured for selecting between different combinations of MIMO 1 and MIMO 2 according to the following configurations:
   path A contains either:
      only MIMO 1 for linear polarization; or
      both MIMO 1 and MIMO 2 for circular polarization; and
   path B contains either:
      only MIMO 2 for linear polarization; or
      both MIMO 1 and MIMO 2 for circular polarization.

10. The reconfigurable beamformer according to claim 3, wherein said digital beamformer is configured to modify a relative phase/amplitude of a single path.

11. The reconfigurable beamformer according to claim 5, wherein said electronic combiner is configured to combine antenna array elements of the antenna array connected to said analog signal processor.

12. The reconfigurable beamformer according to claim 6, wherein said analog beamformer is configured to modify a relative phase/amplitude of each of a plurality of antenna array elements of said antenna array independently.

13. The reconfigurable beamformer according to claim 6, wherein said digital beamformer or said analog beamformer is configured for controlling a relative phase between the two antenna feeds of each antenna array element to provide a desired phase offset.

14. The reconfigurable beamformer according to claim 6 wherein said digital beamformer or said analog beamformer is configured for tuning a relative phase to add a tilt to an antenna pattern.

15. The reconfigurable beamformer according to claim 1, further comprising: two antenna arrays, wherein a path A input/output is connected to only a first antenna array of the two antenna arrays, and a path B input/output is connected to a second antenna array of the two antenna arrays.

16. The reconfigurable beamformer according to claim 15, wherein an antenna array element of said first antenna array has said path A connected to a feed of both the first antenna array and the second antenna array, and an antenna array element of said second antenna array has said path B connected to the feed of both the first antenna array and the second antenna array.

17. The reconfigurable beamformer according to claim 1, wherein said reconfigurable beamformer comprises only a single antenna array, wherein a path A input/output is connected to only one half of said antenna array, while a path B input/output is connected to the other half of said antenna array.

18. The reconfigurable beamformer according to claim 17, wherein each antenna array element of said antenna array has path A connected to one antenna feed and path B connected to another antenna feed.

* * * * *